United States Patent
Murata et al.

(10) Patent No.: US 8,136,998 B2
(45) Date of Patent: Mar. 20, 2012

(54) BEARING APPARATUS

(75) Inventors: Junji Murata, Kashiba (JP); Kazuyoshi Yamakawa, Nishinomiya (JP); Kazutoshi Toda, Tondabayashi (JP); Toshiyuki Saito, Kashiba (JP); Shinya Ochi, Hamura (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 572 days.

(21) Appl. No.: 12/314,366

(22) Filed: Dec. 9, 2008

(65) Prior Publication Data

US 2009/0154862 A1 Jun. 18, 2009

(30) Foreign Application Priority Data

Dec. 13, 2007 (JP) ................................. 2007-321558
Dec. 13, 2007 (JP) ................................. 2007-321763

(51) Int. Cl.
*F16C 33/60* (2006.01)
(52) U.S. Cl. ........................................ 384/570; 384/457
(58) Field of Classification Search .................. 384/457, 384/499–502, 513, 516, 569, 570, 572, 573, 384/577
See application file for complete search history.

(56) References Cited

U.S. PATENT DOCUMENTS

| 4,475,777 | A | * | 10/1984 | Hofmann et al. | 384/572 |
| 6,981,801 | B2 | | 1/2006 | Yokota | |
| 2002/0085783 | A1 | * | 7/2002 | Yokota | 384/577 |
| 2005/0213856 | A1 | * | 9/2005 | Geka et al. | 384/45 |
| 2007/0116393 | A1 | * | 5/2007 | Oishi et al. | 384/457 |
| 2007/0223854 | A1 | | 9/2007 | Waseda et al. | |
| 2011/0064350 | A1 | * | 3/2011 | Yamakawa et al. | 384/577 |

FOREIGN PATENT DOCUMENTS

| EP | 1696143(A2) | 8/2006 |
| JP | 2000-240660(A) | 9/2000 |
| JP | 2002-195270(A) | 7/2002 |
| JP | 2006-144985 | 6/2006 |
| JP | 2006-234074(A) | 9/2006 |
| JP | 2006-234134 | 9/2006 |
| JP | 2006-336765 | 12/2006 |
| JP | 2007-2914 | 1/2007 |
| JP | 2007-247875 | 9/2007 |
| JP | 2007-303657 | 11/2007 |
| JP | 2008-95723 | 4/2008 |
| JP | 2009-19701 | 1/2009 |

OTHER PUBLICATIONS

Japanese Office Action dated Dec. 13, 2011 with an English translation thereof.

* cited by examiner

*Primary Examiner* — Thomas R Hannon
(74) *Attorney, Agent, or Firm* — McGinn IP Law Group, PLLC (57) ABSTRACT

A bearing apparatus includes: two split outer ring halves which are mounted to the housing; a plurality of rolling elements which are provided so as to roll on the two split outer ring halves; and a cage which holds the rolling elements such that the rolling elements are disposed at substantially equal intervals in a circumferential direction of the cage and which is split at a position of the cage to form joint surfaces, an outside diameter of the cage being guided by inner circumferential surfaces of the split outer ring halves. An outside diametrical dimension in a normal direction to the joint surfaces is made larger than an outside diametrical dimension of the cage in a direction parallel to the joint surface, and vicinity of an outside diametrical position of the cage lying in the normal direction is made to be guided by the outer ring halves.

3 Claims, 9 Drawing Sheets

BEARING APPARATUS

BACKGROUND OF THE INVENTION

The present invention relates to a bearing apparatus, and more particularly to a bearing apparatus including a divided rolling bearing and a housing which supports the rolling bearing.

In automotive and marine engines, a bearing for supporting a crankshaft which converts reciprocating motions of pistons into rotary motions thereof is disposed between counterweights or a counterweight and a large end of a connecting rod, and hence, a split bearing is used which is divided into two halves or parts in a circumferential direction.

Although slide bearings have conventionally been used as the supporting bearing, due to recent rising demands for better fuel economy for those engines, it has been proposed to use rolling bearings which are split in a circumferential direction in place of the slide bearings in order to decrease running loss.

The split rolling bearing includes, for example, a pair of split outer ring halves, a plurality of rolling elements or rollers which are provided in such a manner as to roll on respective inner surfaces of the split outer ring halves, and a pair of split cages for holding the respective rollers in such a manner that the rollers are disposed at substantially equal intervals in a circumferential direction. Then, a crankshaft is fitted in the rolling bearing as an inner ring member (for example, refer to JP-A-2006-336765, and JP-A-2006-234134, JP-A-2006-144985).

Further, in the split rolling bearing, while circumferential end surfaces of the pair of split outer ring halves are brought into abutment with each other to form a joint surface, due to an assembling error in assembling the rolling bearing in the housing which has the bearing bore in which the rolling bearing is accommodated or machined conditions of a fitting area of the housing, there may be produced a radial offset between the confronting end portions of the split outer ring halves. As a result, there may be produced a level difference in the joint surface in such a manner as to project radially inwards.

Figure 9:
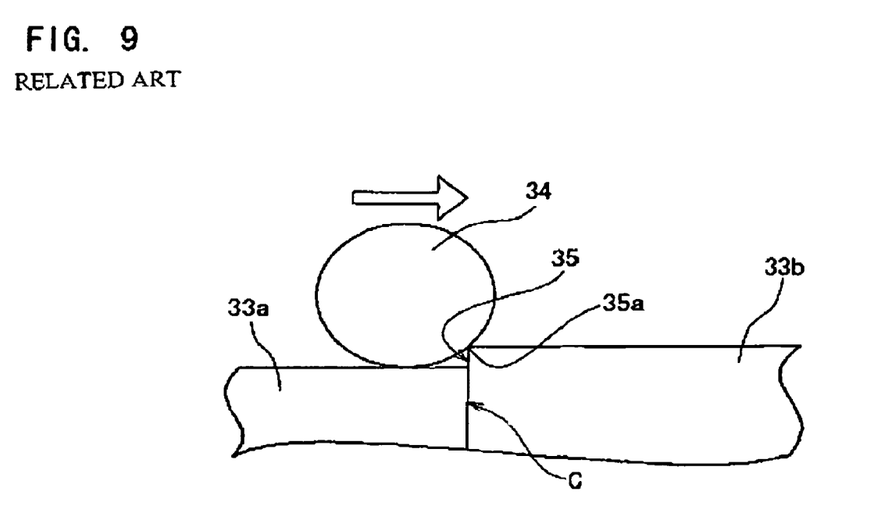
FIG. 9 is an explanatory sectional view taken at a portion lying in the vicinity of a joint surface of conventional split outer ring halves.

In addition, as is shown in FIG. 9, in the event that a level difference 35 is produced in a radial direction (a vertical direction as viewed in FIG. 9) in a joint surface C between split outer ring halves 33a, 33b, when a roller 34 passes near the joint surface of the outer ring halves where the level difference 35 is being produced, a circumferential surface of the roller collides against an angular edge 35a of the level difference 35, leading to a fear that noise and vibration are generated.

When the roller passes through the level difference, vibration and noise are generated, which is not preferable. To eliminate the effect imposed by the level difference, there have been made various proposals in relation to configurations and sizes of split outer ring halves.

For example, JP-A-2006-336765 proposes that circumferential end portions of outer ring halves are machined to produce inclined surfaces thereof. In addition, JP-A-2006-234134 proposes that a distance from an outer circumferential surface of an inner ring to inner circumferential surfaces of outer ring halves is made larger than an outside diameter of a roller in a position where a joint surface of the outer ring halves exists.

However, the vibration and noise generated when the roller passes through the level difference cannot be sufficiently suppressed with these structures.

Further, in conventional bearing apparatuses including those described in JP-A-2006-336765 and JP-A-2006-234134, however, attention is paid only to a contact between rollers and a level difference, and there has been proposed no conventional bearing apparatus in which attention is paid to a contact between the level difference and circumferential end surfaces of cages. Namely, when rollers roll in association with the rotation of a crankshaft and split cages then start to rotate, circumferential end surfaces of the split cages come into contact with the level difference, whereby vibration and noise may be generated. However, there has been proposed nothing to avoid the contact between the end surfaces of the outer ring halves and the end surfaces of the cages.

SUMMARY OF THE INVENTION

The invention has been made in view of these situations, and an object thereof is to provide a bearing apparatus which can prevent the generation of noise and vibration which would be caused by the contact between the end surfaces of the outer ring halves and the end surfaces of the cages.

A further object of the invention is to provide a bearing apparatus which can suppress the generation of noise and vibration which would be generated when rolling elements pass through a joint surface of split outer ring halves.

In order to achieve the object, the present invention provides the following arrangements.

(1) A bearing apparatus for rotatably supporting a shaft to a housing, the bearing apparatus comprising:

two split outer ring halves which are mounted to the housing so as to be in close contact with the bearing bore;

a plurality of rolling elements which are provided so as to roll on respective inner surfaces of the two split outer ring halves; and a cage which holds the rolling elements such that the rolling elements are disposed at substantially equal intervals in a circumferential direction of the cage and which is split at at least one position of the cage to form joint surfaces which are jointed each other, an outside diameter of the cage being guided by inner circumferential surfaces of the split outer ring halves, wherein an outside diametrical dimension of the cage in a normal direction to the joint surfaces is made larger than an outside diametrical dimension of the cage in a direction parallel to the joint surface, and vicinity of an outside diametrical position of the cage lying in the normal direction is made to be guided by the inner circumferential surfaces of the outer ring halves.

(2) The bearing apparatus according to (1), wherein the cage has an elliptic shape in which the normal direction is made to constitute a major axis, while the direction parallel to the joint surface is made to constitute a minor axis.

(3) The bearing apparatus according to (1), wherein an outer circumference of an end portion of the cage which lies in vicinity of the join surface is cut to form a small diameter part so that the outer side diametrical dimension in the normal line is made larger than the outside diametrical dimension of the cage in the direction parallel to the joint surface.

(4) A bearing apparatus for rotatably supporting a shaft to a housing, the bearing apparatus comprising:

two split outer ring halves which are mounted to the housing so as to be in close contact with the bearing bore; and a plurality of rolling elements which are provided so as to roll on respective inner surfaces of the two split outer ring halves, wherein radially inner side edge portions of circumferential end surfaces of the respective split outer ring halves are rounded into round surfaces.

(5) The bearing apparatus according to (4), wherein a relationship of r>d/2 is established where d represents a diameter of the rolling element and r represents a radius of curvature of the rounded surface.

(6) The bearing apparatus according to (4), wherein on a boundary between the rounded surface and an inner circumferential surface of the split outer ring half which follows the rounded surface, a tangent circumscribed to the rounded surface is located within the inner circumferential surface.

In the bearing apparatus according to the first aspect of the invention, the outside diameter of the cage is not such a diameter as to produce a round shape, but the outside diametrical dimension in the normal direction to the joint surface of the cage (a direction perpendicular to a direction in which the joint surface is connected with a center of the cage) is made larger than the outside diametrical dimension in the direction parallel to the joint surface. In addition, the positions on the cage which lie in the vicinity of the outside diametrical positions lying in the normal direction (90° offset direction) are made to be guided by the inner circumferential surfaces of the outer ring halves. Consequently, since the outside diametrical positions on the cage come into contact with the inner circumferential surfaces of the outer ring halves in the vicinity of the positions which are offset 90° from the direction parallel to the joint surface, even in the event that the joint surface or circumferential end surfaces of the cage come to a position where they confront a level difference which is generated by a radial offset of the joint surface of the outer ring halves, a clearance can be provided between the circumferential end surfaces and the level differences, thereby making it possible to prevent the circumferential end surfaces from being brought into contact with the level difference. As a result, the generation of noise and vibration which is attributed to the contact between the circumferential end surfaces of the cages and the level difference can be prevented.

According to the second aspect of the invention, since the long diameter side of the elliptic cage is brought into contact with the inner circumferential surfaces of the outer ring halves to thereby be guided, even though the short diameter side of the cage where the joint surface of the cage exists comes to the position where it confronts the level difference, the circumferential end surfaces of the cage can be prevented from being brought into contact with the level difference.

According to the third aspect of the invention, since the outer circumferences of the end portions of the cage which lie in the vicinity of the joint surface are cut to be formed into the small diameter portion, the cage comes into contact with the inner circumferential surfaces of the outer ring halves in the vicinity of the positions which are offset 90° from the direction parallel to the joint surface. With this structure, even though the small diameter portion where the joint surface of the cage exists comes to the position where it confronts the level difference, the contact of the circumferential end surfaces of the cage with the level difference can be prevented.

According to the bearing apparatus of the invention, the generation of noise and vibration which is attributed to the contact between the end surfaces of the outer ring halves and the end surfaces of the cage can be prevented.

In the bearing apparatus according to the fourth aspect of the invention, the radially inner side edge portions of the circumferential end surfaces of the respective split outer ring halves are each machined in such a manner as to be rounded into the round surface. Consequently, even a level difference is generated in the radial direction in the joint surface of the split outer ring halves, since the rolling elements roll on the smooth rounded surface, an impact generated when the rolling elements pass through the level difference can be suppressed to as low a level as possible, and as a result, the generation of noise and vibration can be suppressed.

According to the fifth aspect of the invention, an impact that would be generated when the rolling elements pass through the level difference can be made smaller.

According to the sixth aspect of the invention, since the rolling elements can shift smoothly from the rounded surface to the inner circumferential surface of the splint outer ring which follows the rounded surface, the generation of noise and vibration can be suppressed further.

According to the bearing apparatus of the invention, noise and vibration that would be generated when the rolling elements pass through the joint surface of the split outer ring halves can be suppressed.

DETAILED DESCRIPTION OF PREFERRED EMBODIMENTS

Hereinafter, an embodiment of a bearing apparatus of the invention will be described in detail by reference to the accompanying drawings.

First Embodiment

Figure 1:
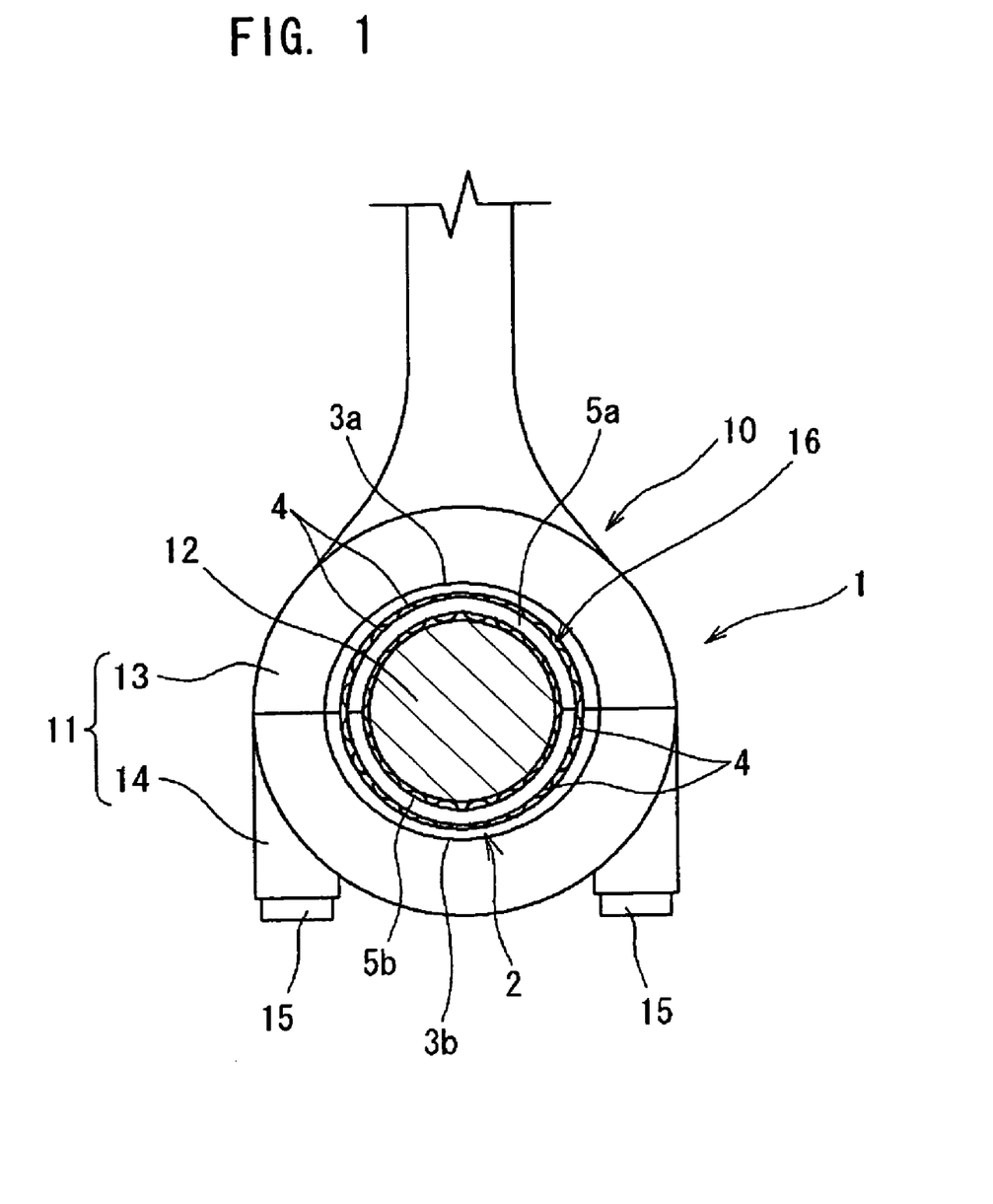
FIG. 1 is an explanatory sectional view of a large end portion of a connecting rod to which a bearing apparatus according to a first embodiment of the invention is applied.

FIG. 1 is an explanatory sectional view of a large end portion of a connecting rod to which a bearing apparatus 1 according to an first embodiment of the invention is applied. A connecting rod 10 is supported on a crankshaft 12 at a large end portion 11 thereof, while a piston is attached to a small end portion, not shown, of the connecting rod 10 via a piston pin.

The large end portion 11 is constructed to form a bearing bore 16 of a substantially circular cross section by fixedly fastening a main body part 13 which constitutes a first housing part having a recessed portion of a substantially semicircular cross section to a cap part 14 which constitutes a second housing part having a substantially semicircular cross section with bolts 15. A split rolling bearing 2 is built into the bearing bore 16 of the substantially circular cross section which is defined by the main body part 13 and the cap part 14.

This rolling bearing 2 includes a pair of split outer ring halves 3a, 3b which are provided within the bearing hole 16 in such a manner as to be in close contact therewith, a plurality of rolling elements or rollers 4 which are provided in such a manner as to roll on respective inner surfaces of both the split outer ring halves 3a, 3b, and a pair of split cages 5a, 5b which are adapted to hold the respective rollers 4 in such a manner that the rollers 4 are disposed at substantially equal intervals in a circumferential direction, and the crankshaft 12 constitutes an inner ring member of the rolling bearing 2.

Figure 2:
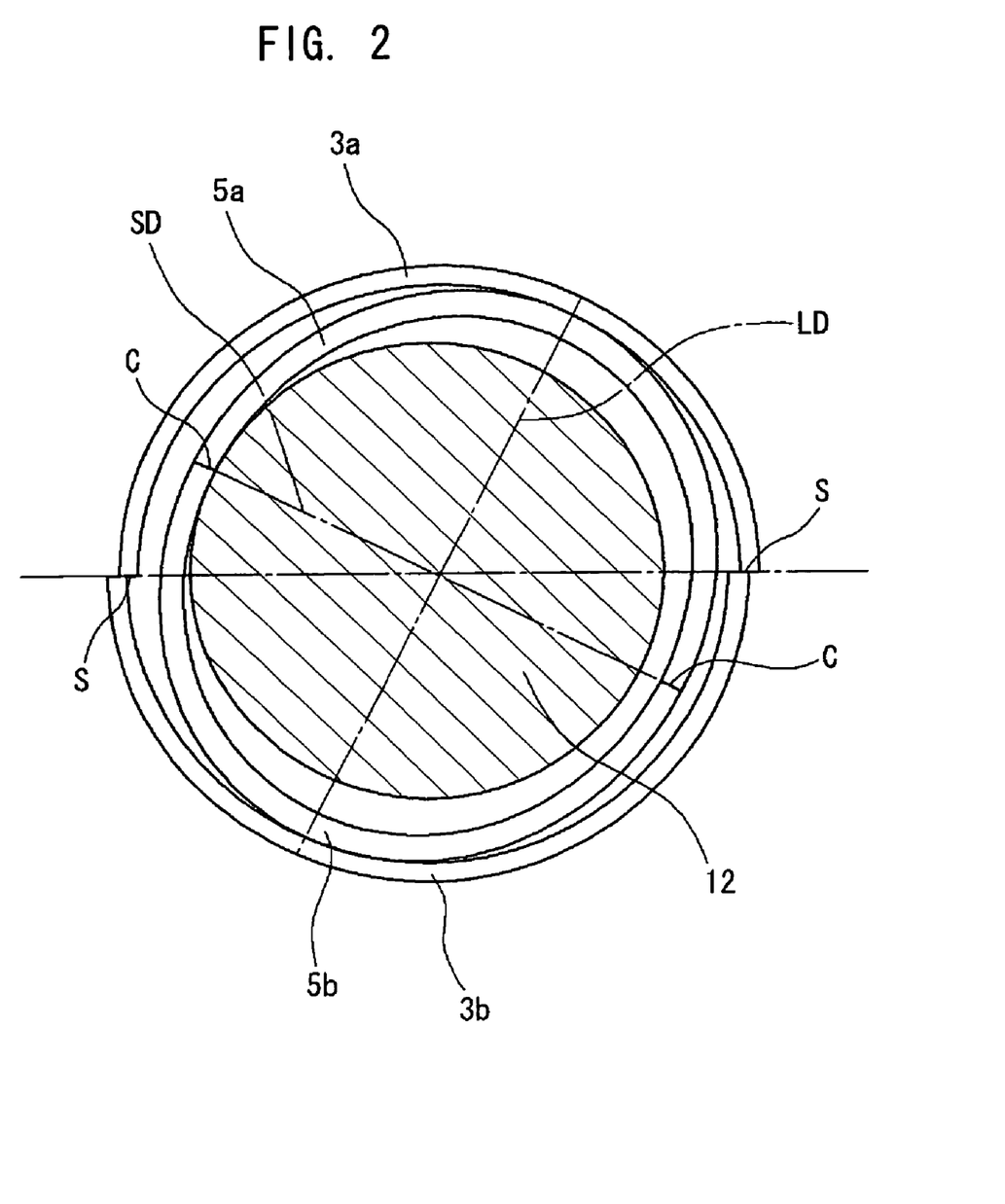
FIG. 2 is a conceptual explanatory diagram of a relationship between outer ring halves, cages and a crankshaft in the bearing apparatus shown in FIG. 1.

FIG. 2 is a conceptual explanatory diagram showing exemplarily a relationship between the outer ring halves 3a, 3b, the cages 5a, 5b and the crankshaft 12 in the bearing apparatus shown in FIG. 1. For easy understanding, the illustration of the rollers 4 is omitted. As is shown in FIG. 2, the cages 5a, 5b exhibit an elliptic shape in which a direction which is offset 90° from a direction of joint surfaces, that is, a normal direction to the joint surfaces, is made to constitute a major axis or a long diameter, and the direction parallel to the joint surfaces, that is, a direction parallel to the joint surfaces, is made to constitute a minor axis or a short diameter. Namely, in FIG. 2, reference character C denotes a joint surface where respective circumferential end surfaces of the cage Sa and the cage 5b are brought into abutment with each other, and the cages 5a, 5b exhibit an elliptic shape in which a joint surface direction in which both joint surfaces C are connected to each other is made to constitute a short diameter SD and a direction which is offset 90° from the joint surface is made to constitute a long diameter LD. By the cages 5a, 5b being made to form a round shape but to form the elliptic shape and long diameter sides of the elliptic shape being made to be brought into contact with inner circumferential surfaces of the outer ring halves, even when short diameter sides of the elliptic shape where the joint surfaces exist come to positions where they confront level differences S which are generated by radial offset of joint surfaces of the outer ring halves 3a, 3b, a clearance can be secured between the circumferential end surfaces of the cages 5a, 5b and the level differences S, thereby making it possible to prevent the circumferential end surfaces of the cages 5a, 5b being brought into contact with the level differences S. As a result, the generation of noise and vibration attributed to the contact between the circumferential end surfaces of the cages 5a, 5b with the level differences S can be prevented.

Although a difference between the long diameter LD and the short diameter SD of the cages 5a, 5b differs depending upon an inside diameter of the outer ring halves 3a, 3b to which the cages 5a, 5b are inscribed and the diameter of the crankshaft 12, normally, the difference can be made to fall in a range of the order of 5 to 50% of the diameter of a roller used (the diameter of a ball when balls are used as rolling elements).

Second Embodiment

Figure 3:
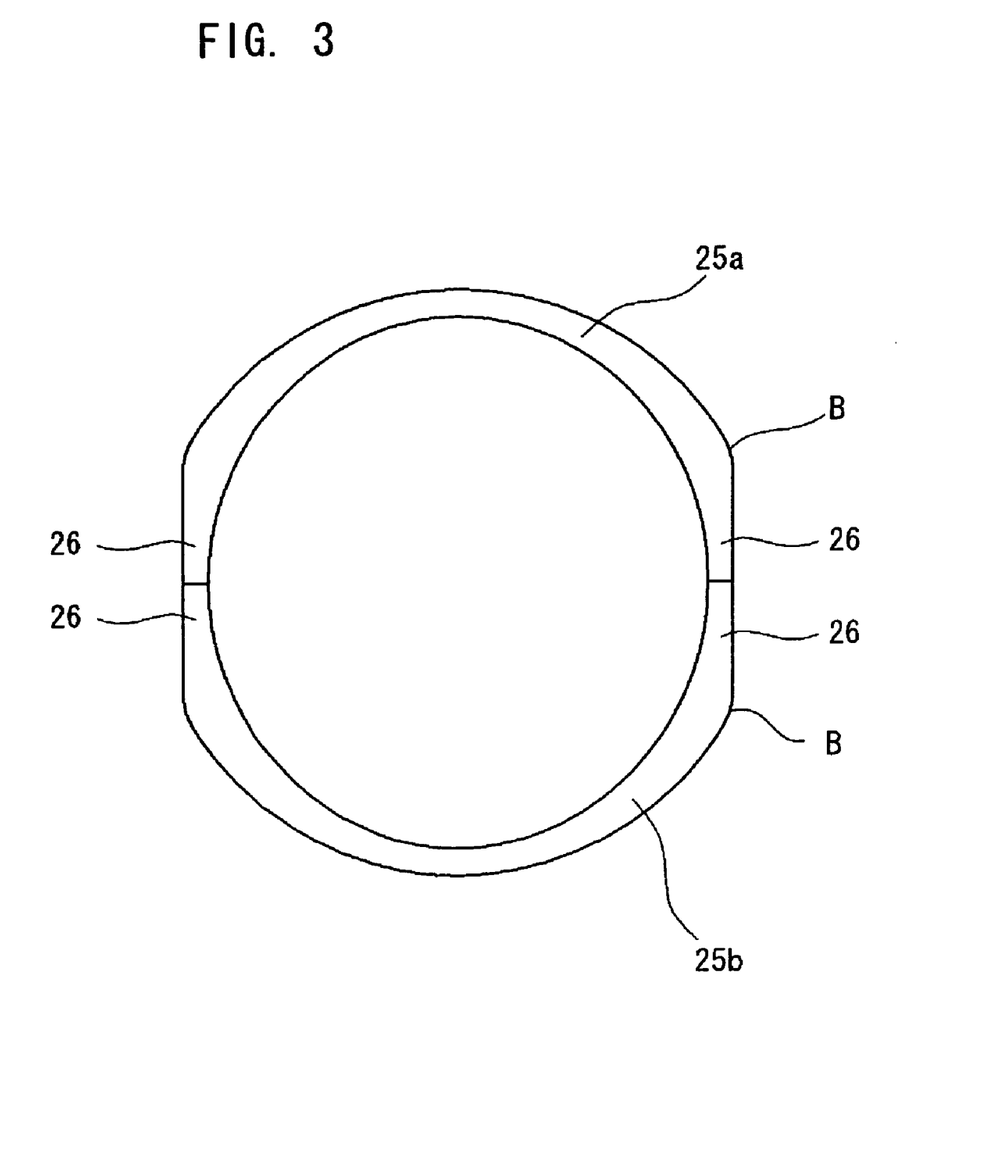
FIG. 3 is an explanatory sectional view of cages according to a second embodiment of a bearing apparatus of the invention.

FIG. 3 is an explanatory diagram of cages in a second embodiment of a bearing apparatus of the invention. In the cages 25a, 25b, outer circumferences of end portions in the vicinity of joint surfaces are cut to form small diameter portions 26 thereat, so as to make an outside diametrical dimension measured in a direction which is offset 90° from the joint surface of the cages 25a, 25b larger than an outside diametrical dimension measured in the direction parallel to the joint surface. Since the outer circumferences of the end portions lying in the vicinity of the joint surfaces of the cages 25a, 25b are cut to form the small diameter portions 26 thereat, the cages are brought into contact with the inner circumferences of the outer ring halves in the vicinity of the positions which are offset 90° from the joint surface direction, whereby even though the small diameter portions 26 where the joint surfaces of the cages 25a, 25b exist comes to a position where they confront the level differences which are produced at the joint surfaces of the outer ring halves, a clearance can be secured between the circumferential end surfaces of the cages 25a, 25b and the level differences, thereby making it possible to prevent the contact of the circumferential end surfaces of the cages 25a, 25b with the level differences.

The small diameter portions 26 can be formed by plasticizing or cutting outer circumferential surfaces of a cage or by molding a cage with small diameter portions by the use of a mold, and after such small diameter portions are formed on a cage in any of the ways described above, the cage is cut apart at the small diameter portions 26, thereby making it possible to obtain a pair of split cages 25a, 25b. Boundaries B between outside diameters of the small diameter portions 26 and outside diameters of the other portions of the cages are not made into an angular edge portion but are preferably made into rounded portions which connect smoothly and continuously the small diameter portions 26 to the other portions of the cages.

Figure 4:
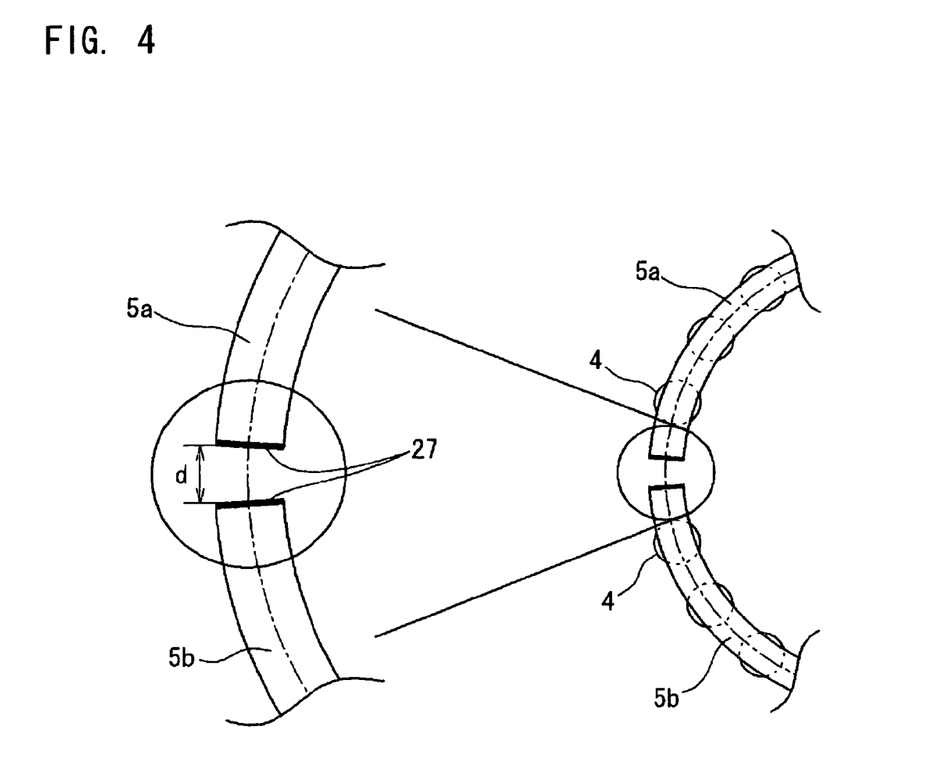
FIG. 4 is an explanatory sectional view taken at a portion lying in the vicinity of a joint surface of the cages.

As is shown in FIG. 4, a shock absorbing layer 27 is preferably provided on the circumferential end surface of the cage for absorbing an impact that would be produced by contact or collision. The rolling speed of the rollers 4 which roll in conjunction with the rotation of the crankshaft 12 does not remain the same in the circumferential direction due to the load applied to the rollers being different depending on the locations of the rollers and differences in circumferential length of the rollers (production errors) being produced even though they are small. Because of this, the rotating speeds of both the cages, and by one cage rotating faster or slower than the other cage, there may be caused such a situate that the circumferential end surfaces of the cages collide against each other. As this occurs, with the shock absorbing layers 27 provided on the circumferential end surfaces of the cages, noise and vibration which would be generated when the end surfaces are brought into contact with each other can be suppressed.

The shock absorbing layer 27 can be provided on the circumferential end surface of the cage by electro-deposition or spray coating a resin selected from, for example, unsaturated polyester, epoxy, alkyd, urethane and the like on to the circumferential end surface. The thickness of the shock absorbing layer 27 is preferably in the range of the order of 5 to 30 μm. In the event that the thickness is thinner than 5 μm, the shock absorbing effect is decreased, and hence, noise and vibration that would be produced when the cages are brought into collision with each other cannot be absorbed sufficiently. In contrast to this, in the event that the thickness exceeds 30 μm, the resulting coat of resin protrudes to come into collision with the level difference between the outer ring halves. In addition, a distance d between the surfaces of the shock absorbing layers 27 on the confronting end surfaces of the cages is preferably in the range of the order of 0.1 to 3 mm. In the event that the distance d is smaller than 0.1 mm, the gap is clogged when the cages are heated, whereas in the event that the distance d is larger than 3 mm, leading to a problem that an impact that would be generated by collision of the cages is increased.

Figure 6A:
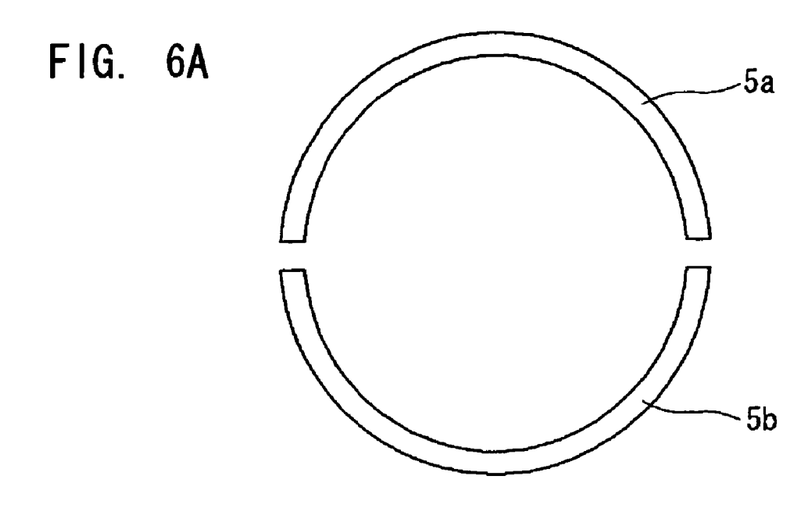
FIGS. 6A and 6B are explanatory diagrams showing examples of cages.

In addition, as a cage for holding rolling elements, the invention is not limited to the split cages 5a, 5b (refer to FIG.

Figure 6B:
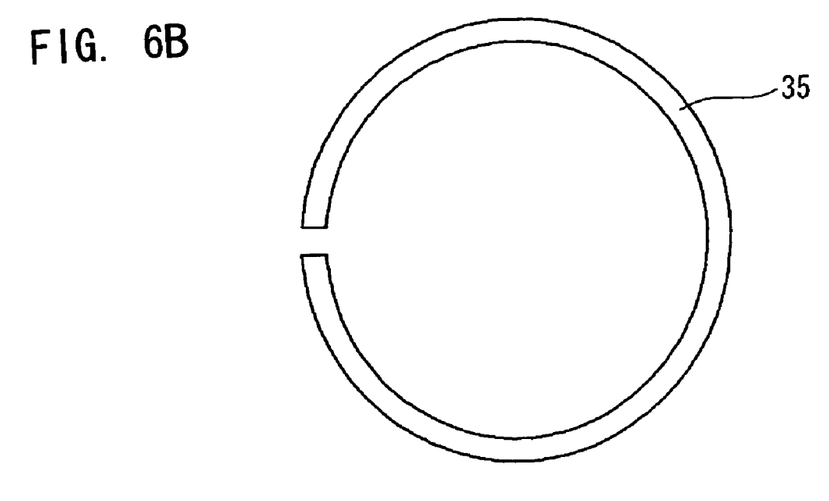

6A), and a cage for holding rolling elements may be such that the cage is split or discontinued in at least one location in a circumferential direction. Therefore, a cage 35 of a discontinued type (a C-shaped type) as is shown in FIG. 6B may be adopted.

Third Embodiment

Figure 7:
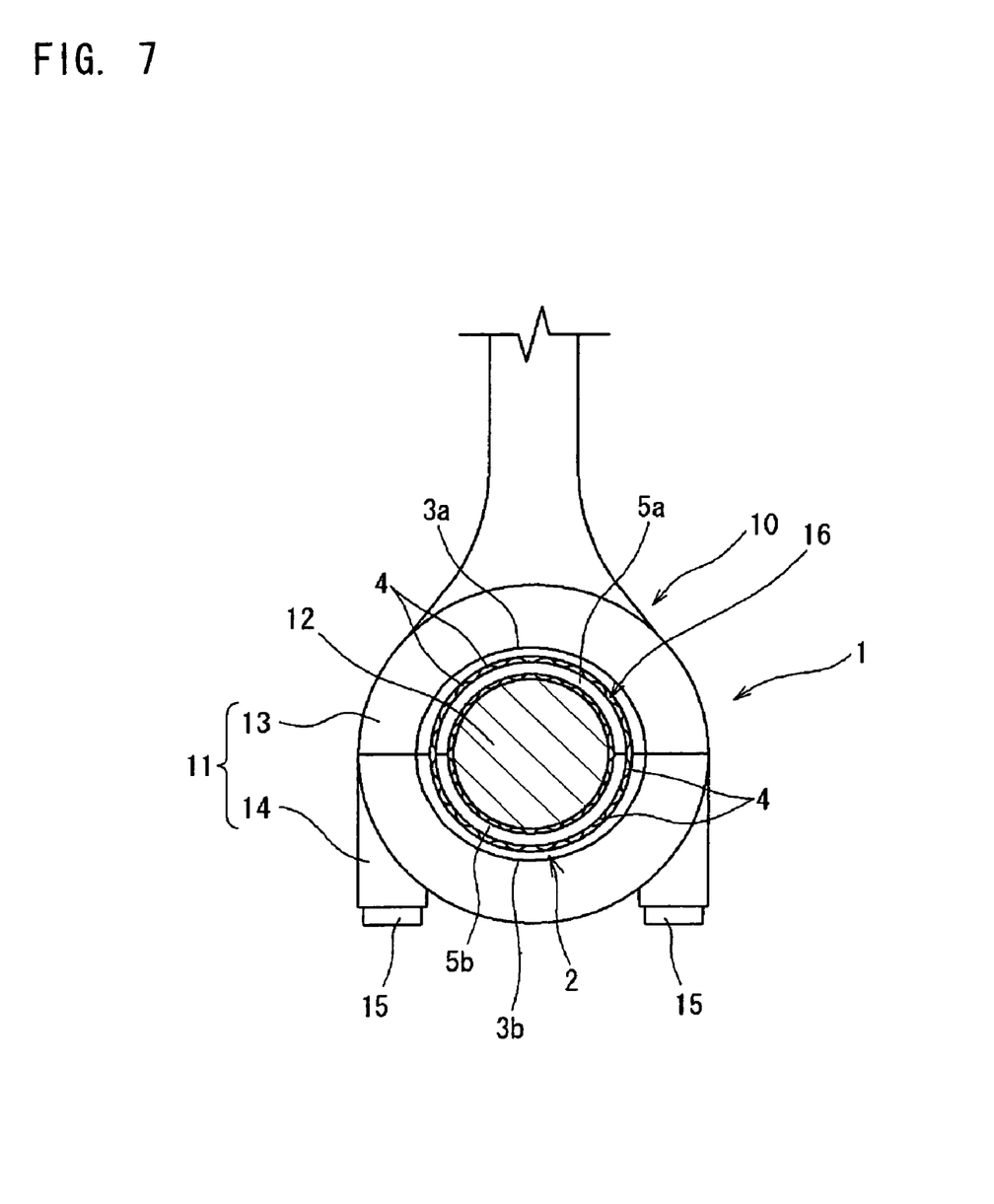
FIG. 7 is an explanatory sectional view of a large end portion of a connecting rod to which a bearing apparatus according to a third embodiment of the invention is applied.

FIG. 7 is an explanatory sectional view of a large end portion of a connecting rod to which a bearing apparatus 1 according to a third embodiment of the invention is applied. A connecting rod 10 is supported on a crankshaft 12 at a large end portion 11 thereof, while a piston is attached to a small end portion, not shown, of the connecting rod 10 via a piston pin.

The large end portion 11 is constructed to form a bearing bore 16 of a substantially circular cross section by fixedly fastening a main body part 13 which constitutes a first housing part having a recessed portion of a substantially semicircular cross section to a cap part 14 which constitutes a second housing part having a substantially semicircular cross section with bolts 15. A split rolling bearing 2 is built into the bearing bore 16 of the substantially circular cross section which is defined by the main body part 13 and the cap part 14.

This rolling bearing 2 includes a pair of split outer ring halves 3a, 3b which are provided within the bearing hole 16 in such a manner as to be in close contact therewith, a plurality of rolling elements or rollers 4 which are provided in such a manner as to roll on respective inner surfaces of both the split outer ring halves 3a, 3b, and a pair of split cages 5a, 5b which are adapted to hold the respective rollers 4 in such a manner that the rollers 4 are disposed at substantially equal intervals in a circumferential direction, and the crankshaft 12 constitutes an inner ring member of the rolling bearing 2.

Figure 8A:
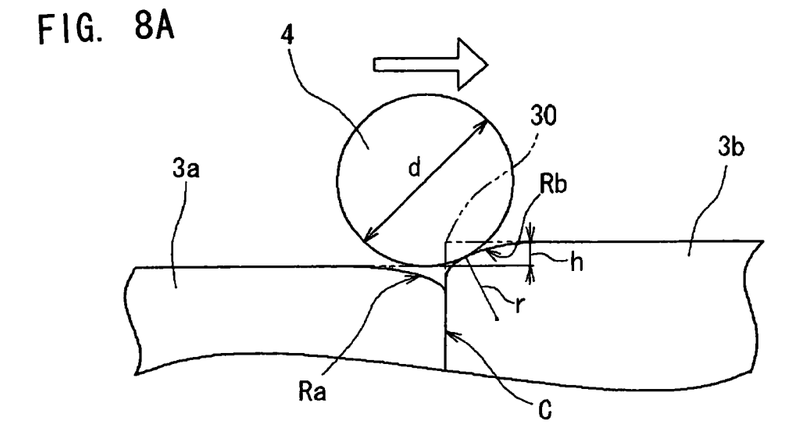
FIG. 8A is an explanatory sectional view taken at a portion lying in the vicinity of a joint surface of split outer ring halves in the bearing apparatus shown in FIG. 1.
Figure 8B:
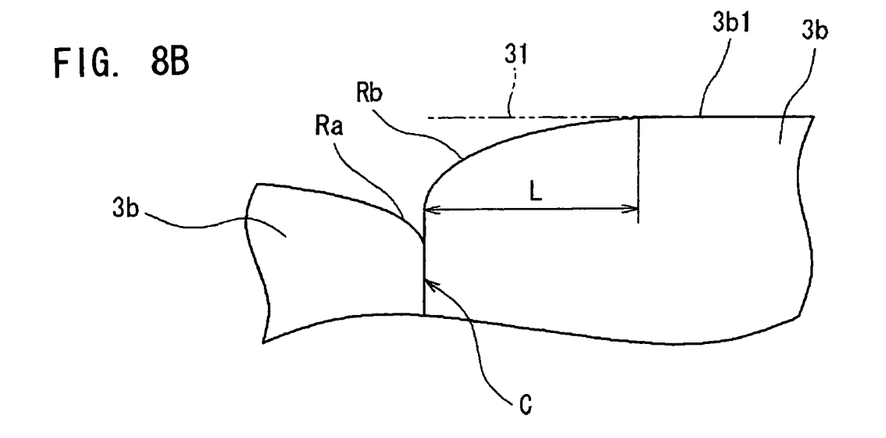
FIG. 8B is a partially enlarged view of the portion lying near the joint surface.

The invention is characterized in that radially inner side (which is a side on which the rolling elements roll) edge portions are each machined in such a manner as to be rounded into a round surface. FIG. 8A is an explanatory sectional view taken at a portion lying in the vicinity of a joint surface C between the split outer ring halves 3a, 3b in the bearing apparatus 1 shown in FIG. 7, and FIG. 8B is a partially enlarged view of the portion near the joint surface C. A radial (vertical in FIG. 8A) offset is produced between circumferential end portions of the split outer ring half 3a and circumferential end portions of the split outer ring half 3b, and this offset causes a level difference of a magnitude denoted by h in the joint surface C between the split outer ring halves 3a, 3b. In the event that the roller 4 rolls on the joint surface C where the difference level remains, a circumferential surface of the roller 4 collides against an angular edge 30 at the level difference to generate an impact, and noise and vibration attributed to the impact are generated.

In contrast to this, in the third embodiment, the radially inner side (the upper side in FIG. 8A and the side on which the rollers 4 roll) edge portions of the circumferential end portions of the split outer ring halves 3a, 3b are machined in such a manner as to be rounded into round surfaces Ra, Rb. Although the roller 4 collides against the round surface Rb of the split outer ring half 3b on a downstream side when it passes the joint surface C, this rounded surface Rb differs from the angular edge 30 at the level difference and constitutes a smooth surface, and therefore, an impact that would be generated by the collision of the roller 4 is decreased. As a result, noise and vibration that would be produced when the roller 4 passes through the joint surface C can be suppressed largely.

The radius of curvature r of the round surfaces Ra, Rb is larger than the radius (d/2) of the roller 4, and a relationship of r>d/2 is established. By a radius of curvature of a circumferential surface of the roller 4 being made larger than the radius of curvature of the rounded surfaces on which the roller 4 rolls while colliding thereagainst, the impact generated when the roller 4 passes through the joint surface C can be decreased further.

In addition, although the magnitude of the radius of curvature can be selected depending upon the sizes (inside diameter, outside diameter and the like) of the split outer ring halves 3a, 3b, the diameter of the roller 4 or the magnitude h of an estimated level difference, the radius of curvature r can normally be set to a range of r<100 (mm) in order to round a level difference of a magnitude of the order of 0.01 mm into a round surface. In addition, a distance L (refer to FIG. 8B) from the joint surface C to a boundary between the round surface Rb and an inner circumferential surface 3b1 of the split outer ring half which follows the round surface Rb can be made, for example, longer than 0.5 (mm) or L>0.5 (mm) from the viewpoint of producing a smooth round surface having a large radius of curvature.

In addition, in the third embodiment, as is shown in FIG. 8B, the round surface Rb is set in such a manner that a tangent 31 circumscribed to the round surface Rb is situated within the inner circumferential surface 3b1 at the boundary between the round surface Rb and the inner circumferential surface 3b1 of the split outer ring half which follows the round surface Rb. In this case, since the roller 4 can be shifted smoothly from the round surface Rb to the inner circumferential surface 3b1 of the split outer ring half which follows the round surface Rb, the generation of noise and vibration can be suppressed further.

In the third embodiment that has been described above, while the bearing apparatus is embodied into the needle roller bearing which utilizes rollers as rolling elements, the bearing apparatus of the invention can also be applied to a ball bearing which utilizes balls as rolling elements.

Figure 5:
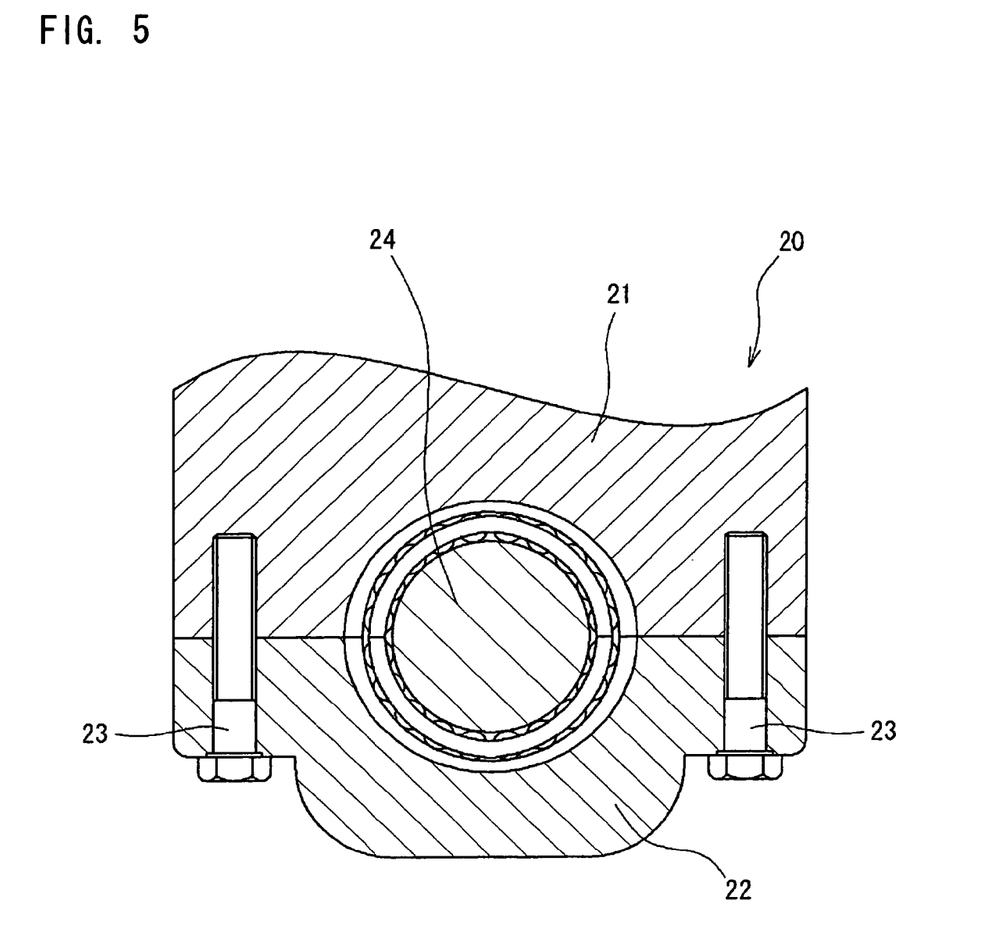
FIG. 5 is an explanatory sectional view of a fixing portion of a crankshaft of an engine to which the bearing apparatus according to the invention is applied.

Note that in the embodiments that have been described heretofore, while the bearing apparatus is described as being applied to the large end portion of the connecting rod, the bearing apparatus can also be applied to a crankshaft supporting bearing which is disposed within a bearing bore which is defined by an upper block 21 which is a housing making up part of the crankshaft fixing part and a lower block 22 which is a housing adapted to be connected integrally with the upper block 21, as is shown in FIG. 5. In addition, in FIG. 5, reference numeral 23 denotes fixing bolts for fixing the upper block 21 and the lower block 22 together, and reference numeral 24 denotes a supporting shaft or journal of the crankshaft.

Furthermore, in the embodiment that has been described heretofore, while the crankshaft is illustrated as a shaft that is fitted in the bearing, the bearing apparatus of the invention can also be applied to other shafts including a camshaft.

Furthermore, needless to say, the above embodiments can be combined with each other to further enhance the performance of the bearing apparatus.

What is claimed is:

1. A bearing apparatus for rotatably supporting a shaft to a housing, the bearing apparatus comprising:
   two split outer ring halves which are mounted to the housing so as to be in close contact with a bearing bore of the housing; and
   a plurality of rolling elements which are provided so as to roll on respective inner circumferential surfaces of the two split outer ring halves, wherein radially inner side edge portions of circumferential end surfaces of the respective split outer ring halves are rounded into round surfaces, wherein the plurality of rolling elements comprise rollers, and wherein a relationship of r>d/2 is established where d represents a diameter of the rolling element and r represents a radius of curvature of the rounded surfaces.

2. The bearing apparatus according to claim 1, wherein, on a boundary between the rounded surface and the inner circumferential surface of the split outer ring half which follows the rounded surface, a tangent circumscribed to the rounded surface is located within the inner circumferential surface.

3. The bearing apparatus according to claim 1, wherein each of the circumferential end surfaces of the respective split outer ring halves is rounded into rounded surfaces.

* * * * *